(12) United States Patent
Zorzi (10) Patent No.: US 11,473,442 B1
(45) Date of Patent: Oct. 18, 2022

(54) RE-CIRCULATING HEAT PUMP TURBINE

(71) Applicant: Aetherdynamic Power Systems, LLC, Houston, TX (US)

(72) Inventor: Kim Alexander Zorzi, Hempstead, TX (US)

(73) Assignee: AETHERDYNAMIC POWER SYSTEMS LLC, Houston, TX (US)

( * ) Notice: Subject to any disclaimer, the term of this patent is extended or adjusted under 35 U.S.C. 154(b) by 0 days.

(21) Appl. No.: 17/482,278

(22) Filed: Sep. 22, 2021

Related U.S. Application Data (60) Provisional application No. 63/081,614, filed on Sep. 22, 2020.

(51) Int. Cl.
  *F01D 15/10* (2006.01)
  *F01D 13/00* (2006.01)
  (Continued)

(52) U.S. Cl.
  CPC .............. *F01D 15/10* (2013.01); *F01D 1/06* (2013.01); *F01D 13/00* (2013.01); *F01D 13/003* (2013.01); *F01D 13/02* (2013.01); *F01K 3/06* (2013.01); *F01K 7/34* (2013.01); *F01K 7/38* (2013.01); *F01K 21/04* (2013.01); *F01K 21/042* (2013.01); *F02C 1/002* (2013.01); *F02C 1/005* (2013.01); *F02C 1/10* (2013.01); *F02G 1/04* (2013.01); *F05D 2210/13* (2013.01); *F05D 2220/762* (2013.01); *F05D 2260/212* (2013.01)

(58) Field of Classification Search
  CPC ...... F02C 1/06; F02C 1/08; F02C 1/02; F02C 1/05; F02C 1/002; F02C 1/005; F02C 1/10; F02G 1/04; F01D 1/06; F01D 13/02; F01D 13/003; F01D 13/00; F01D 15/08; F01D 15/10; F05D 2210/13; F05D 2220/762; F05D 2260/212; F01K 3/06; F01K 7/34; F01K 7/38; F01K 21/04; F01K 21/042

See application file for complete search history.

(56) References Cited

U.S. PATENT DOCUMENTS 2,392,623 A * 1/1946 Traupel ..................... F02C 9/24
  60/684
2,472,846 A * 6/1949 Nettel ....................... F02C 1/08
  60/39.23

(Continued)

*Primary Examiner* — Mickey H France
(74) *Attorney, Agent, or Firm* — Gugliotta & Gugliotta LPA (57) ABSTRACT

An improved steam engine is provided for operating on a recirculation of superheated air and steam. A gas turbine is including having a first intake, a first discharge and a power output shaft, said power output shaft providing rotation power output generated from a change in entropy of the gas through the turbine. A power turbine superheats the gas discharge and includes a turbocharger in operational communication with an electric DC motor, and a compressor mechanically driven by the turbocharger. The discharge from the compressor forms the turbine steam intake. A water injection system may be further provided for adding steam to the air recirculating circuit. A drive motor operatively coupled to the turbine may be used for startup to bring the turbine up to operational rotation speeds. A DC generator operatively coupled to recharge a battery driving the drive motor or for providing electrical power output.

6 Claims, 5 Drawing Sheets

(51) Int. Cl.
  *F02G 1/04* (2006.01)
  *F02C 1/00* (2006.01)
  *F01D 1/06* (2006.01)
  *F02C 1/10* (2006.01)
  *F01D 13/02* (2006.01)
  *F01K 21/04* (2006.01)
  *F01K 3/06* (2006.01)
  *F01K 7/34* (2006.01)
  *F01K 7/38* (2006.01)

(56) References Cited

U.S. PATENT DOCUMENTS

| | | | | |
|---|---|---|---|---|
| 3,307,350 A * | 3/1967 | Squires | ................ | F01K 21/047 60/39.181 |
| 4,667,467 A * | 5/1987 | Archer | ................ | F01K 23/067 60/39.12 |
| 4,858,428 A * | 8/1989 | Paul | ................ | F02C 9/18 60/39.17 |
| 5,634,340 A * | 6/1997 | Grennan | ................ | F02C 6/16 60/648 |
| 5,666,800 A * | 9/1997 | Sorensen | ................ | C10K 1/004 60/39.463 |
| 10,309,262 B2 * | 6/2019 | Bak | ................ | F02C 1/04 |
| 10,480,343 B1 * | 11/2019 | Zorzi | ................ | F01D 1/32 |
| 2002/0050134 A1 * | 5/2002 | Bronicki | ................ | F02C 7/141 60/39.182 |
| 2003/0005696 A1 * | 1/2003 | Wilson | ................ | F01K 23/065 60/618 |
| 2004/0006994 A1 * | 1/2004 | Walsh | ................ | F01D 17/165 60/39.512 |
| 2004/0025513 A1 * | 2/2004 | Walsh | ................ | F02C 7/10 60/39.53 |
| 2004/0163391 A1 * | 8/2004 | Frutschi | ................ | F02C 6/003 60/612 |
| 2005/0072154 A1 * | 4/2005 | Frutschi | ................ | F01K 21/04 60/670 |
| 2005/0106092 A1 * | 5/2005 | Dziobek | ................ | C01B 21/26 423/392 |
| 2005/0109033 A1 * | 5/2005 | Braun | ................ | F02C 9/26 60/39.27 |
| 2006/0117735 A1 * | 6/2006 | Harazim | ................ | F01K 21/042 60/272 |
| 2006/0248899 A1 * | 11/2006 | Borchert | ................ | F02C 6/18 60/791 |
| 2009/0158739 A1 * | 6/2009 | Messmer | ................ | F01K 21/047 60/648 |
| 2010/0019496 A1 * | 1/2010 | Yu | ................ | F02C 3/24 60/785 |
| 2012/0000642 A1 * | 1/2012 | Betzer Tsilevich | ................ | B03D 1/02 166/57 |
| 2012/0036860 A1 * | 2/2012 | Wettstein | ................ | F02C 9/26 60/39.511 |
| 2012/0131918 A1 * | 5/2012 | Held | ................ | F01K 3/185 60/671 |
| 2013/0294892 A1 * | 11/2013 | Dewis | ................ | F02C 6/16 415/121.3 |
| 2014/0026573 A1 * | 1/2014 | Palmer | ................ | F01K 19/04 60/671 |
| 2018/0142577 A1 * | 5/2018 | Ortmann | ................ | F01K 3/06 |
| 2018/0142581 A1 * | 5/2018 | Jeong | ................ | F01K 25/103 |
| 2020/0224557 A1 * | 7/2020 | McAuliffe | ................ | F02C 6/08 |
| 2020/0224589 A1 * | 7/2020 | McAuliffe | ................ | F01K 23/10 |
| 2020/0263603 A1 * | 8/2020 | Homison | ................ | F02C 6/12 |
| 2021/0239041 A1 * | 8/2021 | Spadacini | ................ | F02C 1/06 |
| 2022/0042453 A1 * | 2/2022 | Akba | ................ | F02C 6/04 |

* cited by examiner

RE-CIRCULATING HEAT PUMP TURBINE

RELATED APPLICATIONS

The present invention claims benefit of U.S. Provisional Application 63/081,614, filed on Sep. 22, 2020, and incorporated by reference as if fully rewritten herein.

BACKGROUND OF THE INVENTION

1. Field of the Invention

The present invention relates generally to air engines and, more particularly, to an air engine incorporating an improved super heated self compressed rotary turbine.

2. Description of the Related Art

An improved super-heated self-compressed rotary air turbine is taught and described in U.S. Pat. No. 10,480,343 in the name of the present inventor and incorporated by reference as if fully rewritten herein. Such a system teaches a built-in, outside-in axial flux generator provided for providing power to heaters in thermal communication with the walls of the turbine chambers. Moisture within the working fluid is thus heated, making steam and thereby increasing the pressure of the working fluid. The compression caused by the turbine rotation also increases temperature. The discharge of each turbine chamber is feeding a nozzle, giving it the impression of a sprinkler. Such a turbine design is very efficient and also triples the shaft power with extended torque radius resulting from the increased reaction force of the nozzles. The shaft power drives a main generator, and after passing over the turbine the air stream maintains half of its initial energy. The remaining energetic air stream left is then cycled to the compressor, thereby completing the cycle. In operation, a DC bus voltage, which is the main generator, can remain approximately constant, regardless of the load. Input to the compressor can be regulated with the rpm of the compressor motor and the current to the heaters in the turbine.

When the turbine of the '343 reference was initially designed it incorporated heating elements designed to be able to heat up working fluid in each of the plurality of arcuate shaped chambers such as to heat the fluid contents as it flows through the chambers. However, continued development has led to discoveries for improvements to modify such an air engine in which the superheating of the working fluid could be provided without the electric heating elements, but rather from the supercharged air flow. The generation of such a high enough heat range was totally unexpected.

Consequently, an improved air engine incorporating a super-heated, self-compressed air rotary turbine is provided.

SUMMARY OF THE INVENTION

It is an object of the present invention to provide new technology for a steam engine for producing work output.

It is a feature of the present invention to provide an improved turbine having a greater number of expansion chambers and an improved radial compressor supercharger in order to eliminate the need for internal heaters.

Briefly described according to an exemplary embodiment of the present invention, an improved air engine is provided for operating on a recirculation of superheated air-steam working fluid. The turbine has a first fluid intake, a first fluid discharge and a power output shaft, said power output shaft providing rotation power output generated from a change in entropy of the combines air-steam working fluid through the turbine. A power turbine superheats the working fluid discharge and includes a turbocharger in operational communication with an electric DC motor, and a compressor mechanically driven by the turbocharger. The discharge from the compressor forms the turbine intake. A water injection system may be further provided for adding steam to the working fluid reticulation circuit. A drive motor operatively coupled to the turbine may be used for startup to bring the turbine up to operational rotation speeds. A DC generator operatively coupled to recharge a battery driving the drive motor or for providing electrical power output The main turbine includes an improved rotating core assembly forming a greater number (i.e., 16 instead of 8) desending chambers to provide increased air flow volume and increased power output without the need for the addition of internal heat from electric heaters (as provided in the prior art).

Advantages of the present improvements allow for increase torque and shaft power upwards of a 250% as compared to known configurations of recirculating compressed air engines.

Further objects, elements, features and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures as improvements to the Related Art, namely, improvements to U.S. Pat. No. 10,480,343 in the name of the present inventor. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

1. Detailed Description of the Figures

Referring now to the drawings, wherein like reference numerals indicate the same parts throughout the several views, an improved re-circulating heat pump turbine, generally noted as 10, is shown according to a preferred embodiment of the present invention shown herein in an exemplary configuration intended as a portable, self contained operational unit. An improved air turbine 12 may be provided to mount a DC generator 14. Additional power conditioning and controls, generally 16, may further be provided for conditioning any power output according to a desired use case.

A supercharger assembly 18 may be provided comprised of a 3-stage radial compressor 20 positioned behind a turbo charger 22. The turbocharger 22 receives super heated air exhaust 30 from the air turbine 12 and uses this heated, pressurized working fluid to spin up the supercharger 18. The speed of the turbo charger 22 will match the required speed needed by the supercharger 18 to output the required pressure to sustain operation. There may be an axial electric DC motor 32 connected to the rear of the supercharger stack up 18. The DC motor 32 may be activated with a start button (not shown). The supercharger 18, when spun up to 100 k rpm, may output 1010° F. fluid at 250 psi to provide a sustaining heat source within the working fluid such that no additional heaters are required. Once the air turbine 12 is heat soaked by this heat output, the rotational speed can be decreased until the output pressure is reduced to 100 psi. This will still provide a working temperature at 500° F. The axial electric motor 32 may then spin up the supercharger 18 and the turbo charger 22, receiving power from a lithium ion battery (not shown). Such a battery having 100 amp hours (100 Ah) may be provided.

The axial DC generator 14 may be utilized as provided by AVID Technology Limited of Northumberland, UK or a similar or functional equivalent. An AVID model AF-230 or equivalent may be used providing 240 KW output at 4000 rpm. Such a DC generator is built primarily for the electric car market and, as such, it may function as both a DC electric axial motor and an axial DC generator. For use in the present invention, it is intended to be used as a generator. Another, second generator may also be installed behind the first one in a piggy back style in order to increase power output. It is anticipated that the generator should preferably perform to the following specification:

290 nm/213 ft lbs torque required;
57.5 kg/126 lbs weight;
Outside diam. 300 mm/12 inches;
Width; 212 mm/8 inches;
Maximum RPM; 2000-8000; and
Air Turbine torque output @ 302 FT LBS @ 4000 RPM with safety factor built in.

The battery (not shown) that may be used may be a high density lithium ion battery with a 100 Ah rating. An advantage of using lithium ion, rather than lead acid batteries, is to allow the battery to hold a charge down to the last 10 percent while being rechargeable at a faster charging rate. Such a battery weight is 100 lbs. or 45.35 Kilograms. By adding a second battery, one may be charging while the other is being used. In such an arrangement, battery controls may be utilized to prevent over-charging. In operation when the start pushbutton is pressed, power is sent to the electric motor from the battery and the supercharger is spun up to create pressure to the turbine inlet. A DC battery charger is used to recharge the battery, which may take about 1 hour. Charging may take place from a DC invertor output after the generator has reached its full output. In the exemplary configuration shown, the charger box may be mounted on the rear electric panel.

A Water Injection System 40 may be provided comprised of a pressure bottle 44. The pressure bottle 44 may be built out of standard steel or other functionally equivalent material. Pressure communicated from the 3 stage radial compressor 20 may be directed into the pressure bottle 42 utilizing a control valve 44. As water flows out the bottom when the valve 44 is opened, it may be directed into the throat of the inlet side of the hot air turbine for injecting atomized water to the amount of 1.5 liters hour. When subjected to the 300-500° F., the injected atomized water will instantly become steam.

Figure 1:
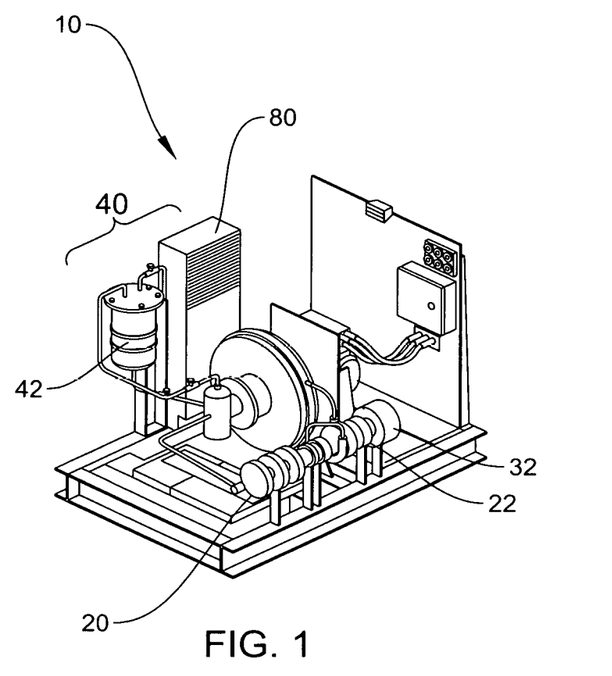
FIG. 1 is a front perspective views of an Air Turbine according to a preferred embodiment of the present invention.
Figure 2:
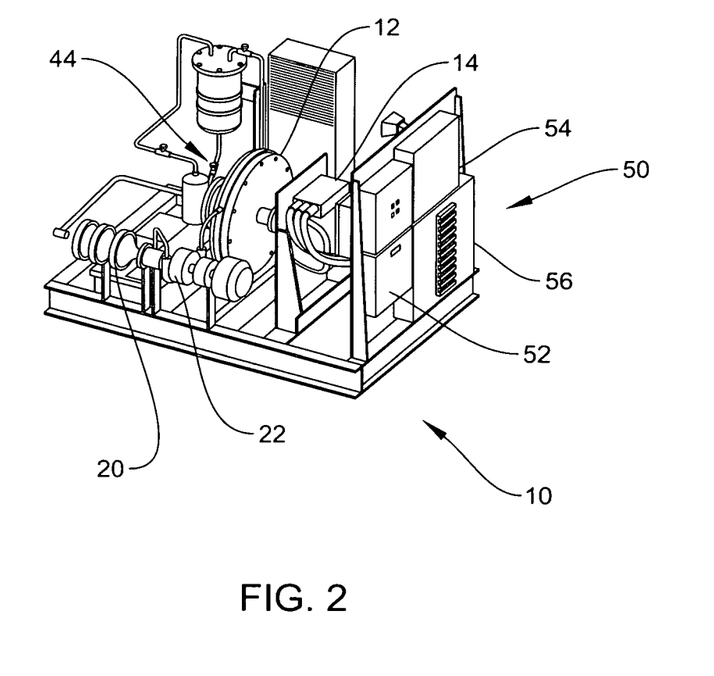
FIG. 2 is a rear perspective view thereof.
Figure 3A:
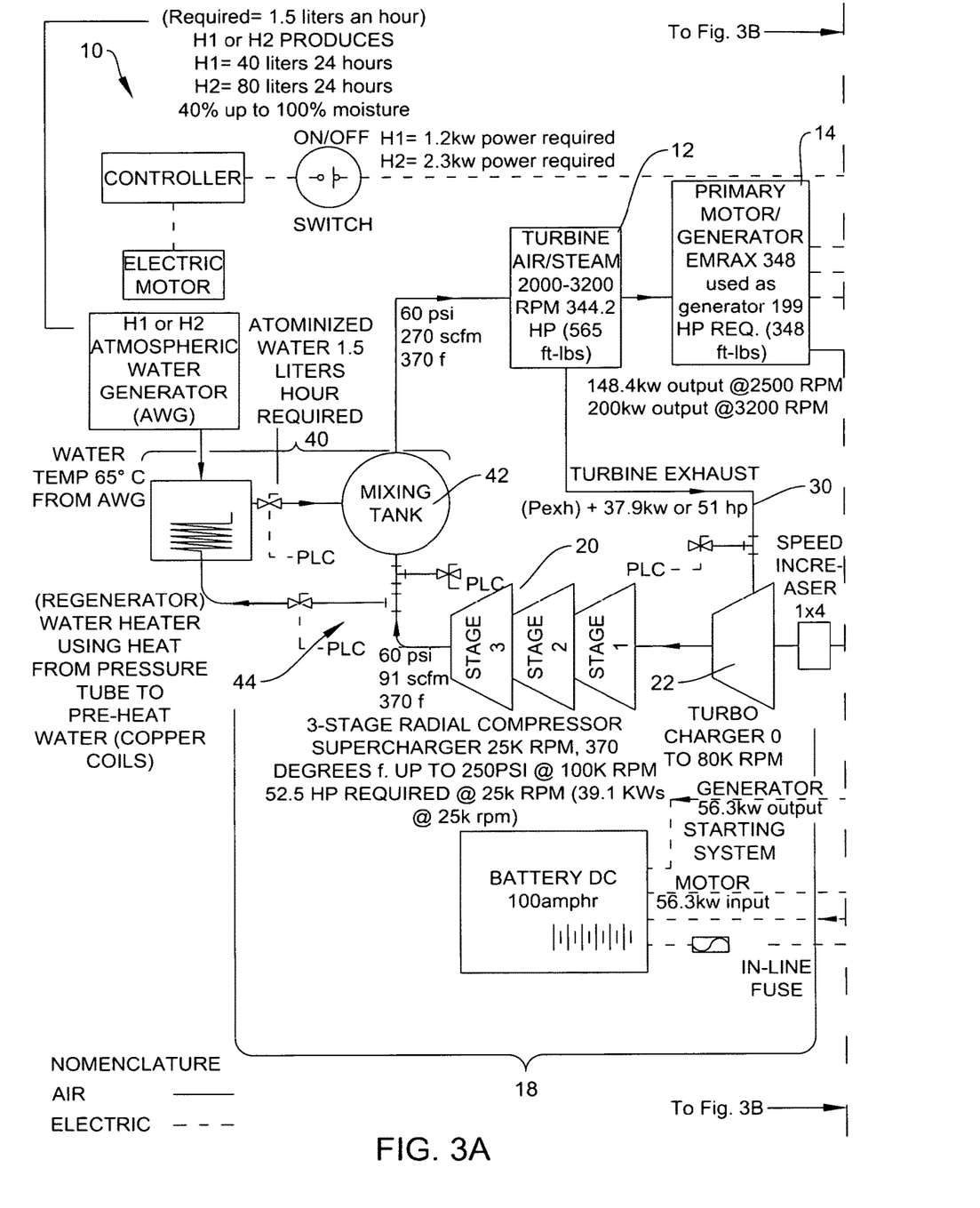
FIG. 3a and FIG. 3B are a process flow diagram of the operation of the Air Turbine according to a preferred embodiment of the present invention.
Figure 3B:
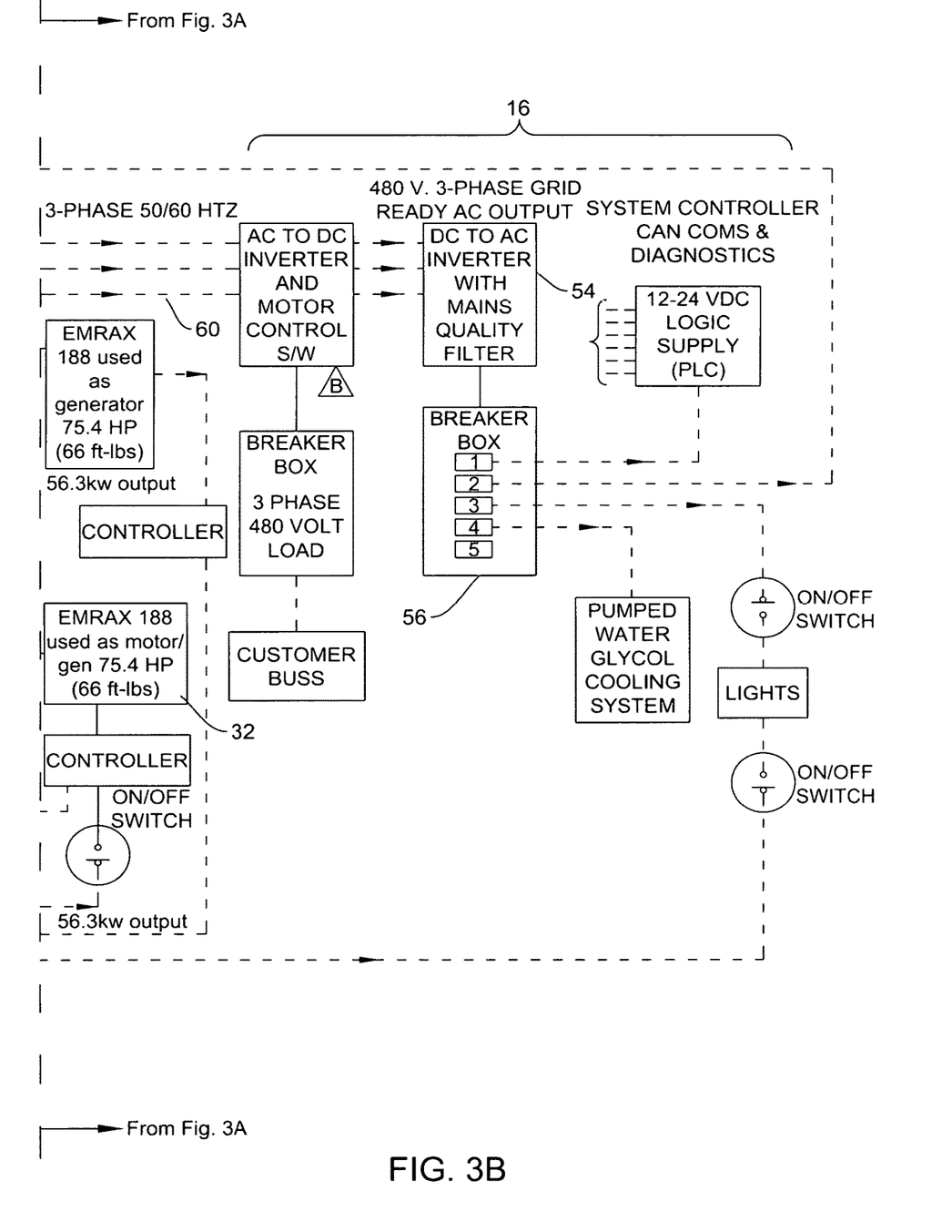
Figure 4:
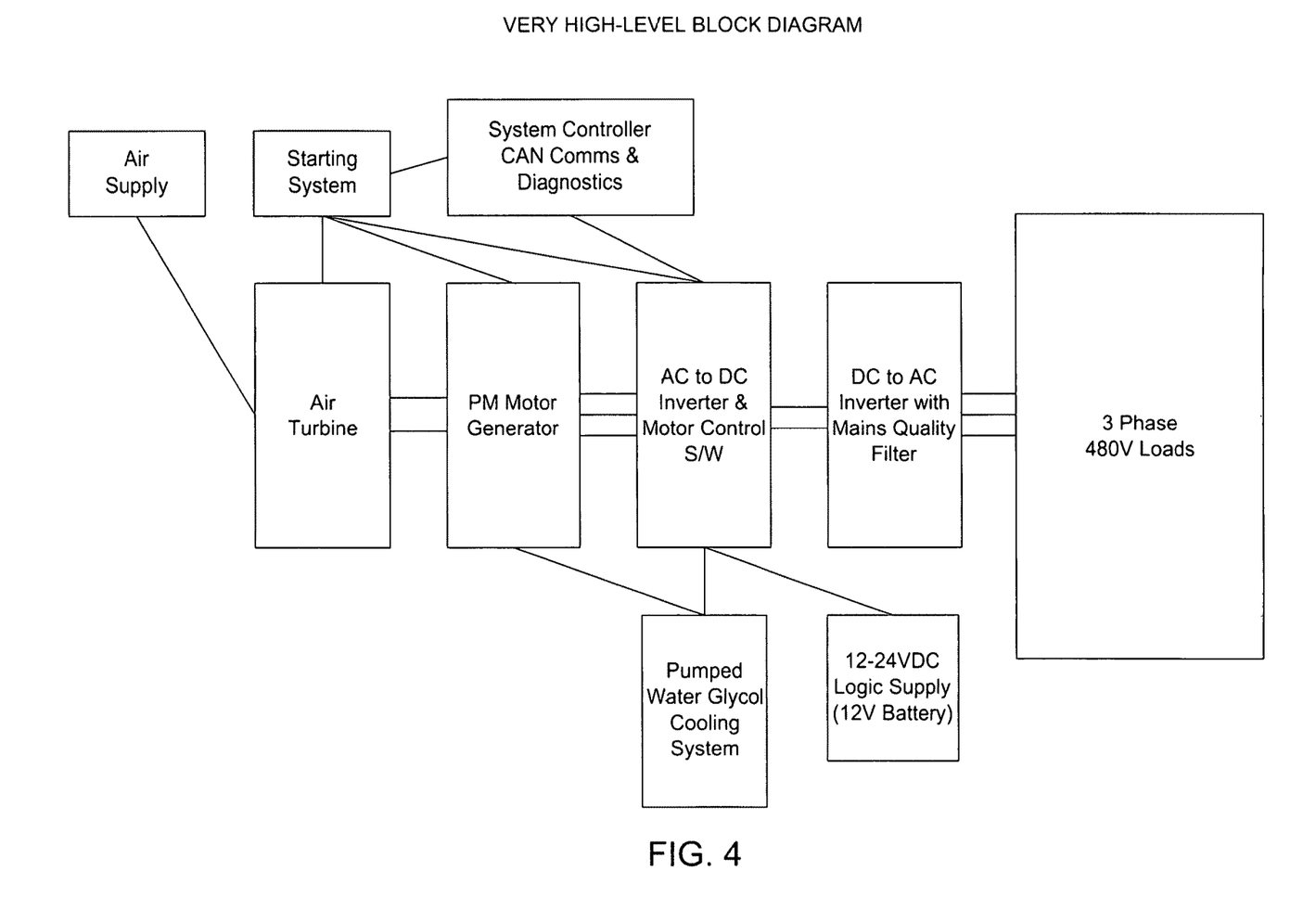
FIG. 4 is a block diagram schematic thereof.

FIG. 2 shows an exemplary configuration of a rear electric panel 50. Inverter panels will be mounted on the rear panel as shown. The inverter panels are quite large and will take up space approximately as shown. A DC to DC inverter box 52 may provide DC output voltage will be 600-800 volts and is supplied to the DC breaker box (14) for customer connection. A DC to AC box 54 may supply power to this breaker panel 56 for any connection requiring AC power.

Charging the battery may be done with either the DC side or the AC. Faster charging time is accomplished with DC input (High Voltage). One hour is all that may be required, similar to an electric car.

As shown, the wires 60 may be connected from the AVID DC motor/generator 14 to the DC-TO-DC control box 16 for distribution.

The supercharger 18 may be comprised of several items. A 3-stage radial compressor 20 may produce 250 psi, 375 scfm @ 100 k rpm. The temperature of the working fluid at the output may be 1010° F. at full rpm. At 50 k rpm it would produce 505° F.; only 300° F. is required to flashpoint water into steam. The RPM may be around 30 k with psi less than 100 and SCFM @ 125. At these conditions the amount of energy required by the electric motor reduces to 60 horsepower or 44.7 kw. The turbo charger 22 may also operate in the 80 k rpm range. Between the turbo charger 22 and the electric motor 32 a gear increaser and a break away clutch may be installed (not shown). The turbo charger 22 will increase in speed as the released heated back pressure in the exhaust of the turbine is recaptured and reused.

Figure 5:
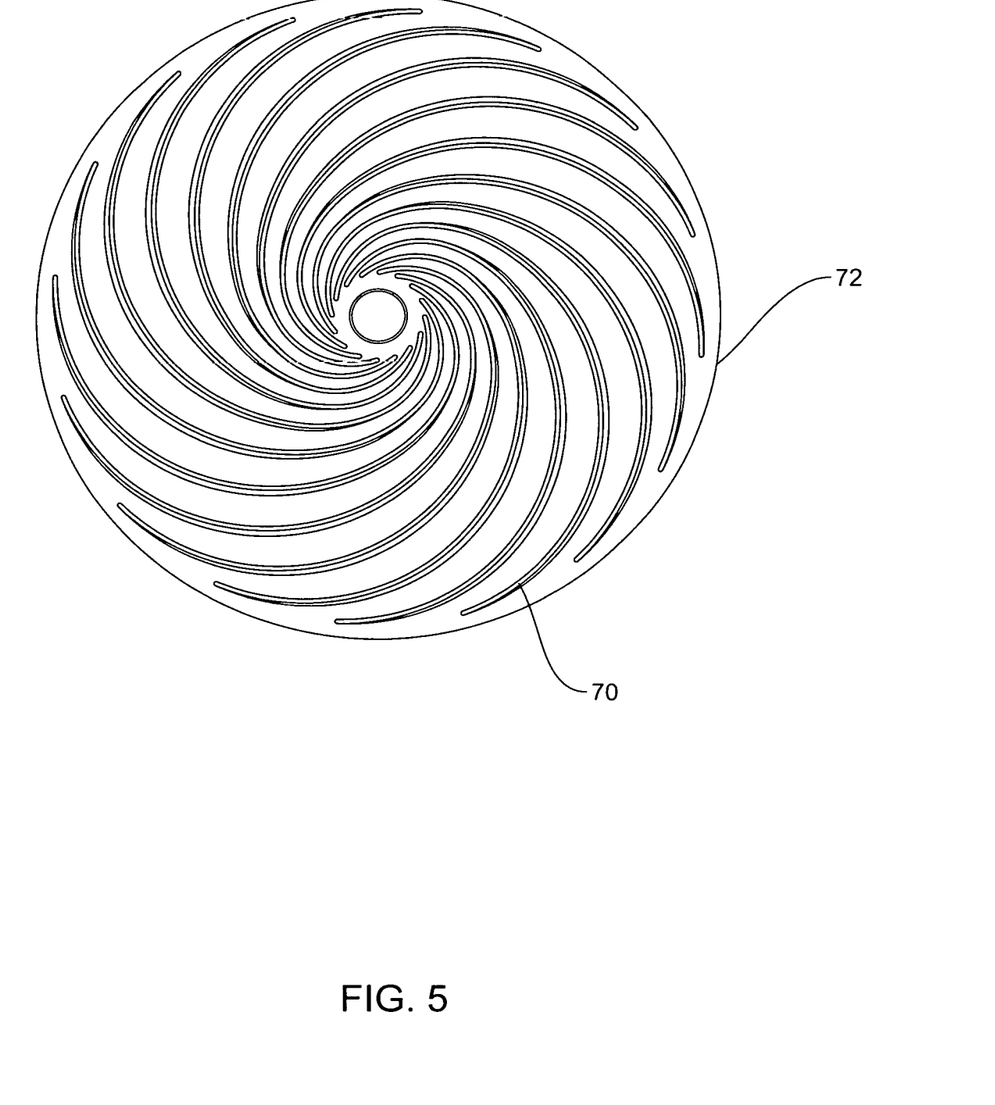
FIG. 5 is a front elevation view of an air turbine core (without end plates) for use therewith.

Referring now in conjunction with FIG. 5, the Recirculating Air Turbine 12 has been modified to a 22" diameter design where the spiral chambers 70 have been moved out to a 10.5" radius. This results in higher reaction force than from the nozzles provided in the Related Art configuration. Further, a major advantage of such a modification is that the torque radius and therefore the shaft power has increased with a factor of 2.5. That means that the air turbine of the present invention, without recycling any air, would have an input of 5 kW have shaft power of 96.25 kW. (Over the original design nozzles have been moved further out and nozzles have been increased from 8 to 16.) The spiral core 72 as shown weighs 146 lbs. (66.2 kg) and can sustain a maximum speed of 4000 rpm.

On the front of the turbine 12 is the mixing tank 42. This tank 42 accepts the heated compressed air from the supercharger 18. Pressure is taken from the mixing tank 42 to pressure up the water injection module. A control valve 44 will let the water be supplied back into the small 3 inch diameter tank at 1.5 liters per hour mixing with the input heated pressure going into the turbine. So we go from a air turbine to a steam turbine. Other gases or liquids can be injected here also such as Deuterium (Heavy Water) or mixing Helium 3 gas, or hydrogen.

Recovery of heated exhaust may provide the needed pressure to spin up the turbo charger 22. The power of this heated exhaust pressure will equal 75.9 kw or 102 horsepower returned. As shown it only takes 44.7 kw's to maintain the air turbines power output to produce the 200 kw's from the generator. If the re-circulating aspect is providing 75.9 kw's and the turbine is actually only using 44.7 kw's then the excess energy will be 31.2 kw's. The excess energy is coming from the steam and subsequent heat energy provided by compression. Heating a given quantity of dry air to 328° F. from 60° F., it will increase in volume under constant pressure over 50 percent. This expansion is due simply to dry air, but when moisture is present to the point of saturation the pressures are greatly increased. If the air at 30 degrees be taken as unity, dry air at 212 degrees will occupy a volume of 1.375 and saturated air at the same temperature 2.672 or about double. This should tell you that with the water injection into the turbine, the horsepower will double and so will the torque output value. Above 300° F., the horsepower will double.

2. Operation of the Preferred Embodiment

In such an operational configuration, the air turbine now becomes a simple steam turbine that enhances the turbines power output up to 1800 times. A boiler is no longer required like used 150 years ago in standard steam engines. Further, an Atmospheric Water Generator (AWG) 80 of a type used by military operative may be operated with only 800 watts of power it can produce 3 liters of water an hour from the atmosphere. Anywhere in the world we can produce our own water from the atmosphere and feed our turbine. This water is fed into the WIS (10) as required.

Recirculating the exhaust creates a continuous operating air-steam turbine. The efficiency of the air turbine because of the recovery of the heated exhaust escalates the figure to 85-95 percent. So now we have a natural form of compressed heat at 300° F. When we combine this with the clean water being provided by the AWG, it produces a totally clean energy system that is unequal to any other produced on the market today.

SHUTDOWN PROCEDURES. This air/steam turbine would run by itself with no human intervention for thousands of hours. But sooner or later it will have to be shut down. If it is disconnected from the electric motor and running on its own back pressure, there is nothing there to stop it. Install a control valve between the exhaust of the turbine and the input side of the turbo charger and dump the exhaust from the turbine and that will shut down the supercharger. Make sure the valve is situated in such a way that the hot exhaust does not blow upward or toward and maintenance personnel. The DC generator will need a glycal coolant pump system and this should be mounted on the front of the Electric panel closes to the generator. That system will help cool the generator from overheating and create a longer life for the unit. There should be an enclosure built to protect the turbine unit.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical*, 520 US 17 (1997) or *Festo Corp. v. Shoketsu Kinzoku Kogyo Kabushiki Co.*, 535 U.S. 722 (2002), or other similar case-law or subsequent precedent should not be made if any future claims are added or amended subsequent to this Patent Application.

What is claimed is:

1. An air-steam engine comprising:
    a gas turbine comprising:
        a first air-steam intake;
        a first air-steam discharge;
        a power output shaft, said power output shaft providing rotation power output generated from a change in entropy of steam;
    a power turbine having a second air-steam intake in fluid communication with the first air-steam discharge and further comprising:
        a turbocharger in operational communication with an electric DC motor;
        a compressor mechanically driven by the turbocharger; and
        a second air-steam discharge in fluid communication with the first air-steam intake;
    a water injection system in selective and controlled fluid communication with the first air-steam intake;
    a drive motor operatively coupled to and driven by said air turbine;
    a DC generator operatively coupled to and driven by power output shaft, wherein during operation steam is communicated in a unidirectional circuit through and between the gas turbine and the compressor; and
    a first valve for regulating flow of liquid from the water injection system to the unidirectional circuit; and
    a second valve for regulating flow of steam and entrained fluids to said first steam intake.

2. The air-steam engine of claim 1, wherein said electric DC motor is operationally coupled with a battery power source.

3. The air-steam engine of claim 2, wherein said DC motor is operationally coupled with the DC generator.

4. The air-steam engine of claim 2, wherein said DC generator is operationally coupled to said battery source for providing recharging of a battery.

5. A method for powering a DC generator using the air-steam engine of claim 1, said method comprising:
    a. operatively coupling said DC generator to a gas turbine;
    b. operatively coupling an input of said air-steam turbine to an output of a compressor;

c. driving said gas turbine by a compressed gas discharge from the compressor; and
d. driving said compressor by a combination of
  i. a drive motor operatively coupled to said compressor; and
  ii. superheated steam discharged from said gas turbine and in fluid communication with a gas intake of the compressor.

6. A method for powering a DC generator, said method comprising:
a. operatively coupling said DC generator to a gas turbine;
b. operatively coupling an input of said gas turbine to an output of a compressor;
c. driving said gas turbine by a compressed steam discharge from the compressor; and
d. driving said compressor by a combination of
  i. a drive motor operatively coupled to said compressor; and
  ii. superheated steam discharged from said gas turbine and in fluid communication with a gas intake of the compressor.

\* \* \* \* \*